United States Patent [19]

McGee et al.

[11] 4,390,186
[45] Jun. 28, 1983

[54] METAL-TO-METAL RIBBED SEAL

[75] Inventors: John K. McGee, Houston; Harold L. Lafferty, Manvel; Charles D. Bridges; Archie L. Smith, both of Houston, all of Tex.

[73] Assignee: Combustion Engineering, Inc., Windsor, Conn.

[21] Appl. No.: 345,797

[22] Filed: Feb. 4, 1982

[51] Int. Cl.³ .................. F16J 15/08; E21B 33/12
[52] U.S. Cl. ........................... 277/236; 277/170; 277/208; 166/195
[58] Field of Search ............... 166/195, 196, 191; 277/168, 170–172, 207 R, 208–211, 236, 235 R

[56] References Cited

U.S. PATENT DOCUMENTS

| | | | |
|---|---|---|---|
| 1,804,619 | 5/1931 | Humason | 277/208 X |
| 2,460,238 | 1/1949 | Penick | 277/170 |
| 2,474,491 | 6/1949 | Penick | 277/236 X |
| 2,766,829 | 10/1956 | Watts et al. | 166/195 X |
| 3,166,345 | 1/1965 | Pinkard | 277/236 X |
| 3,288,472 | 11/1966 | Watkins | 277/236 X |
| 3,302,736 | 2/1967 | Kisling | 277/236 X |
| 3,690,685 | 9/1972 | Porner et al. | 277/235 R X |
| 3,749,426 | 7/1973 | Tillman | 277/236 X |

Primary Examiner—Robert S. Ward, Jr.
Attorney, Agent, or Firm—Cushman, Darby & Cushman

[57] ABSTRACT

In order to provide a metal-to-metal annular seal for use in a high pressure environment typical of a wellhead assembly that is provided on a high pressure, high temperature gas well, especially circumferentially between the outside surface of a tubular part and the inside surface of a relatively massive part, where these parts are to have a fixed longitudinal position relative to one another in use: the available strength for developing the seal are determined; like tapering surfaces are provided on the two parts such as would provide an allowable interference fit when the two parts are brought to the fixed longitudinal position; portions of the outside surface of the tubular part are machined-away to leave tapered land areas, e.g. in two axially closely spaced bands, so that when the two parts are forced to assume the fixed longitudinal position, the seal bands provide an elastic seal that avoids total plastic deformation yet provide the required unit loading. The invention is useful on many types of frusto-conical sealing annuli.

7 Claims, 5 Drawing Figures

METAL-TO-METAL RIBBED SEAL

BACKGROUND OF THE INVENTION

In deeper high temperature gas wells now being drilled, certain seals in the wellhead may be subjected to an internal pressure of up to 30,000 p.s.i., and need to be able to remain in place unobserved and unattended and remain reliable over a several year period, where the operating temperature range incumbent on the seals may be −75° F. to 600° F.

Conventionally, in wellheads, metal ring seals have been used in bolted flanges and clamped between ends provided with especially tapered surfaces. However, these conventional sealing rings have been discovered to be not entirely suitable when used in such a high pressure, high temperature environment. Resilient seals have been found to be less than totally reliable due to insufficient resistance to chemical attack and to high operating temperature.

In one widely used conventional type of seal assembly, a metal seal is crushed against tapers, such as the A.P.I. rings. Connectors were designed to provide a predetermined degree of stand-off between two parts in order to provide a desired, adequate amount of crushing of the intervening seal member. In another prior art variation, a ring-type seal was arranged to be exposed to internal pressure in such a way that an increase in pressure increased the seal ring energization pressure to prevent leakage at high pressure.

SUMMARY OF THE INVENTION

In order to provide a metal-to-metal annular seal for use in a high pressure environment typical of a wellhead assembly that is provided on a high pressure, high temperature gas well, especially circumferentially between the outside surface of a tubular part and the inside surface of a relatively massive part, where these parts are to have a fixed longitudinal position relative to one another in use: the available strength for developing the seal are determined; like tapering surfaces are provided on the two parts such as would provide an allowable interference fit when the two parts are brought to the fixed longitudinal position; portions of the outside surface of the tubular part are machined-away to leave tapered land areas, e.g. in two axially closely spaced bands, so that when the two parts are forced to assume the fixed longitudinal position, the seal bands provide an elastic seal that avoids total plastic deformation yet provide the required unit loading. The invention is useful on many types of frusto-conical sealing annuli.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 4 is an even larger scale fragmentary longitudinal sectional view of the casing bonnet.

DETAILED DESCRIPTION

Figure 1:
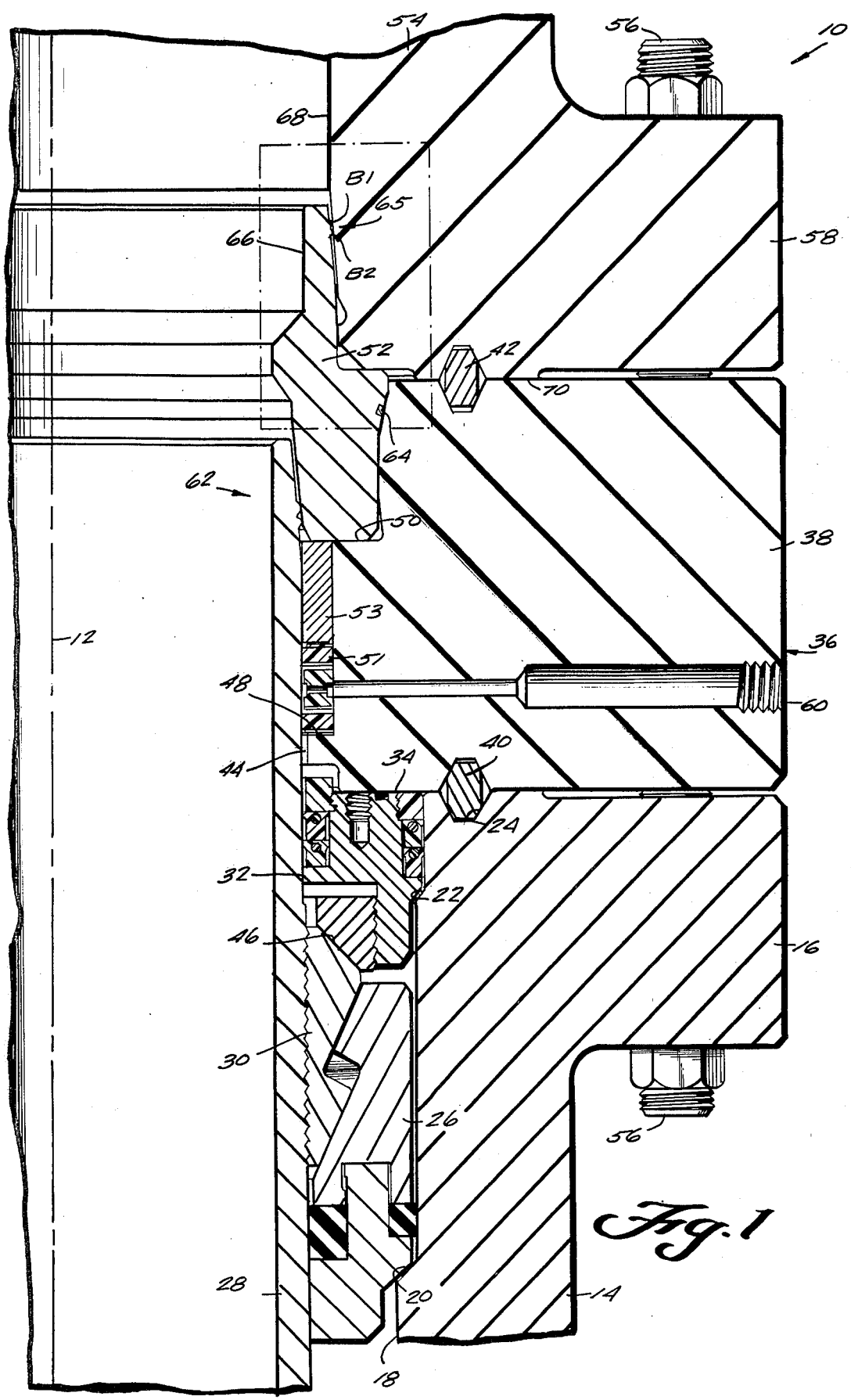
FIG. 1 is a fragmentary longitudinal sectional view of a wellhead (partial completion) showing two instances of use of a metal-to-metal seal in accordance with the present invention.

Referring to FIG. 1, a relevant portion of the wellhead of a deep gas well is shown at 10. Many surrounding and neighboring parts are omitted, as are possible later-installed inner parts. In FIG. 1, one is looking only at the right half of a generally cylindrical assembly, the center line being indicated at 12.

In general, FIG. 1 shows a typical setting in which the seal of the present invention can be put to good use:

Element 14 is a casing head having an upper end flange 16, a longitudinal bore 18, a hanger seat 20, a seat 22 for a casing hold-down assembly, and a conventional circumferential tapering groove 24 provided in the upper end surface for receiving an A.P.I. seal ring. Within the bore 18, a hanger 26 mounts the upper end of a string of well casing 28 to the casing head by the use of slips 30 which engage a broad circumferential band of the outside surface of the casing near but not at the upper end of the casing 28. An adjustable casing hold-down assembly 32 is installed into the casing head/casing annulus so as to engage the slips at 46 and to, in turn, be held down by engagement at 34 with the underside of a next-installed casing head/tubing head adapter 36. Basically, this part is constituted by a thick annular flange 38, having tapering grooves for respective A.P.I. rings 40, 42 in its lower and upper end surfaces.

The casing 28 projects upwards beyond its mechanical, hanging connection to the casing head, and into the bore 44 of a casing head/tubing head adapter 36. Part way up, the bore 44 is enlarged, twice to provide a lower shoulder 48 and an upper shoulder 50. An annular pack-off 51 is received in the annulus between the adapter 36 and the casing 28, and a compression ring 53 on top of that. Next a double-tapered casing bonnet 52 and a tubing head 54 are installed. A ring of bolt assemblies one of which is suggested at 56 is installed through all three flanges, i.e. the casing head upper end flange 16, the adapter flange 38 and the lower end flange 58 of the tubing head 54, and each bolt assembly 56 is appropriately tightened to coordinately accomplish a number of objectives more or less simultaneously:

(A) The underside of the adapter 36 pushes the upper surface of the adjusted casing hold-down assembly down level with the upper end surface of the casing head.

(B) The lower A.P.I ring 40 is partially crushed between the tapering grooves in which it is cooperatively received.

(C) The casing bonnet 52 seats on the upper shoulder 50 thus pushing the upper end surface of the compression ring 53 down level with the upper shoulder 50, and thus axially compressing and perhaps radially expanding the pack-off assembly 51 so that it provides a seal between the casing 28 and the adapter 36. (The seal may be further energized by injection of a plastic, pressurized fluid through a one-way valve fitting (not shown) in the port 60.)

(D) A seal is made-up between the outside of the casing 28 and the inside of the casing bonnet at 62.

(E) The underside of the tubing head 54 pushes down on the casing bonnet 52, so that the casing bonnet is seated on the upper shoulder 50.

(F) A seal is made-up at 64, between the casing bonnet 52 and the adapter 36.

(G) The upper A.P.I. ring 42 is partially crushed between the tapering grooves in which it is cooperatively received; and (H) A seal is made-up at 65 between the outside of the casing bonnet 52 and the inside of the tubing head 54.

The making of all of the above arrangements (A)-(H) by tightening the clamping means 56 has become conventional, what is different about the present invention is the structure and make-up of the seals provided at (D) and (H). Because these are conceptually similar, the one provided at (H) is further described hereinbelow both for its own sake, and as an illustration for the seal that is provided at (D).

It should be apparent that as the bolt assemblies 56 are tightened, the casing bonnet 52 and tubing head 54 are caused to assume a preselected telescopic relationship; the extent of incursion of the neck 66 of the casing bonnet 52 into the bore 68 of the tubing head is positively limited by the abutment of the adapter upper end and the tubing head lower end at 70.

The present invention provides a special contour on the outside surface of the upper end of the tubular part, where it is to engage the bore wall of the surrounding relatively massive part, e.g. where the upper end of the casing bonnet neck 66 is surroundingly engaged by the tubing head 54 at the level of the tubing head lower end flange 58, where the tubing head is rather massive. This special provision is further explained with reference to FIGS. 2-4.

Figure 2:
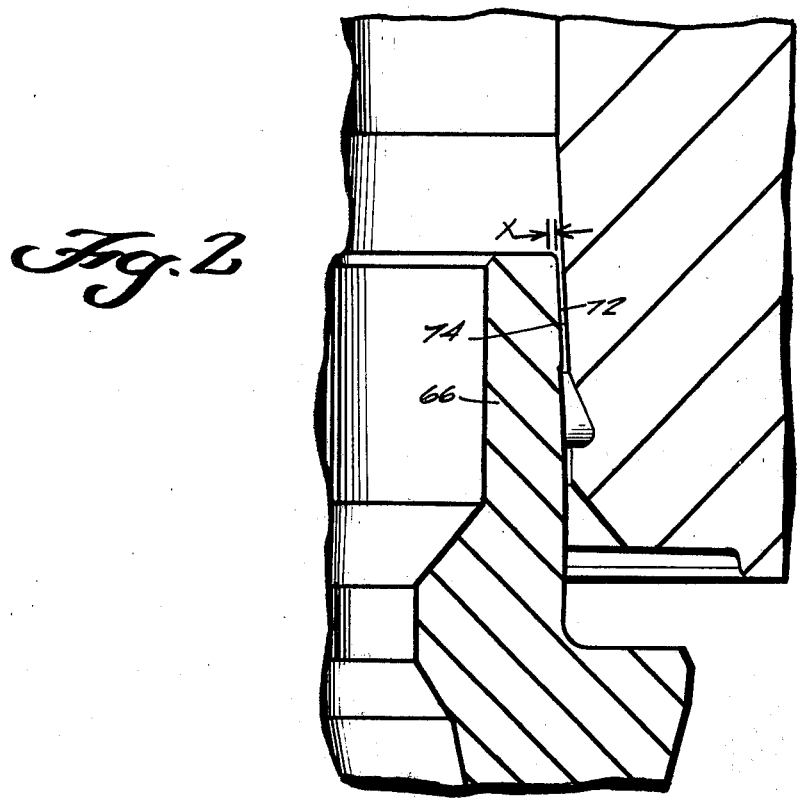
FIG. 2 is an exploded, larger scale fragmentary longitudinal sectional view of the region outlined in phantom lines in FIG. 1, but at an early stage of manufacture.
Figure 3:
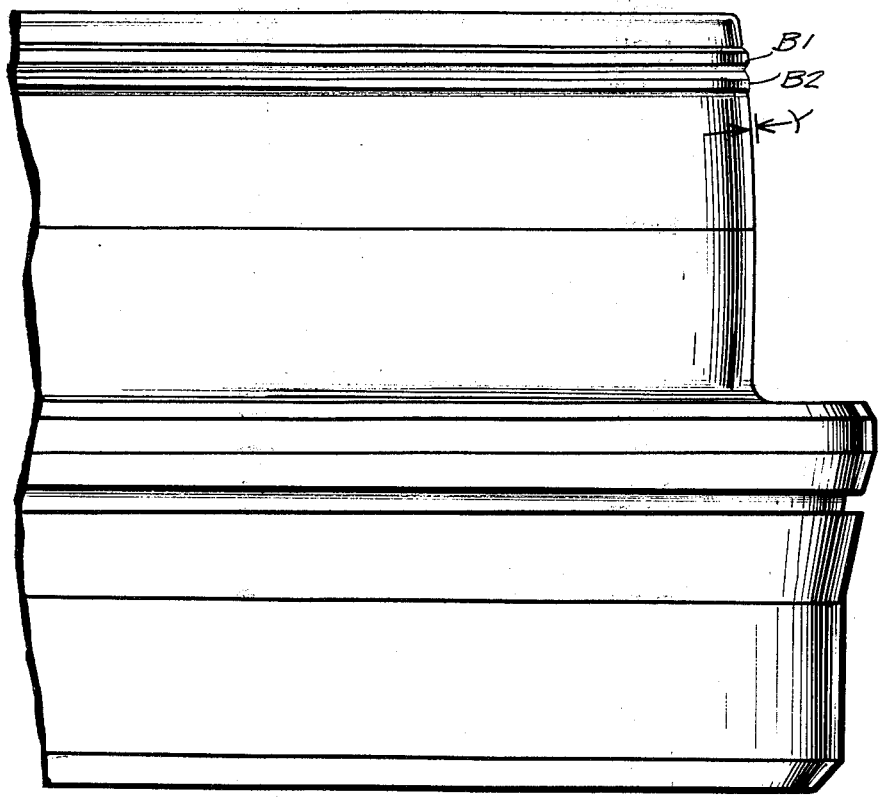
FIG. 3 is a fragmentary elevational longitudinal view of the casing bonnet of FIG. 1, on the scale of FIG. 2.
Figure 1:
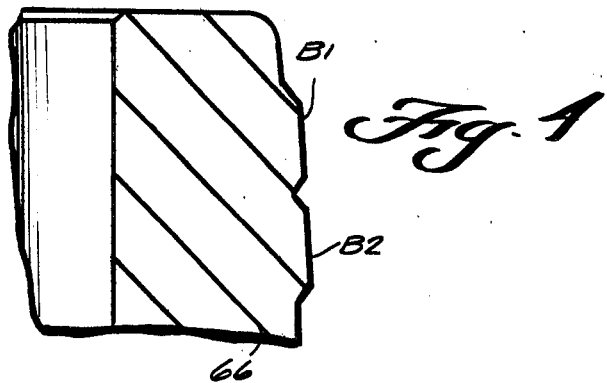
Figure 5:
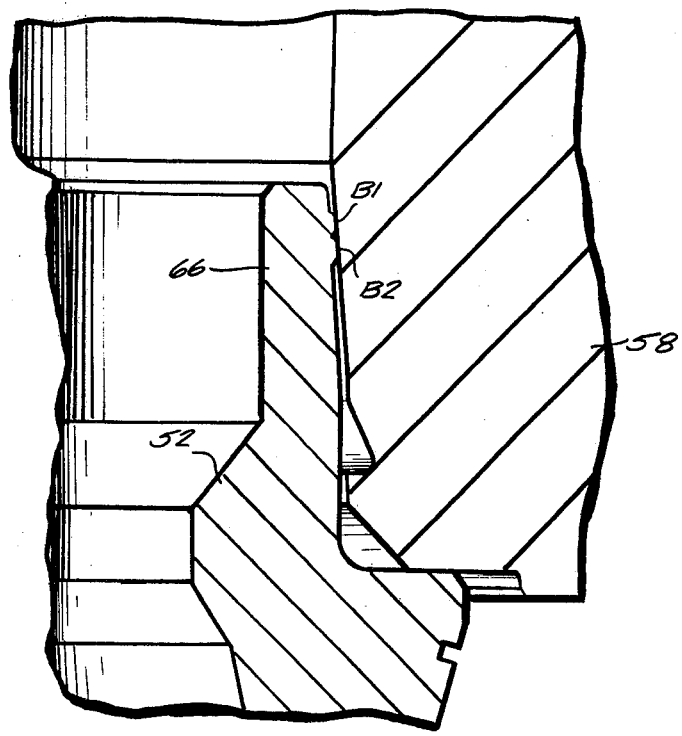
FIG. 5 is a fragmentary longitudinal sectional view of the portion of the assembly within the phantom line outlined region of FIG. 1, on the scale of FIG. 2.

Referring to FIG. 2, basically, the outside surface of the casing bonnet neck 66 at 72 and the inside surface of the tubing head bore at 74 are provided with corresponding tapering circumferential bands. If the band 72 just touched the band 74 at the moment when the last tightening turn was made on the bolt assemblies 56, a seal would have been established, but with zero sealing pressure. If such a construction were put into use it would not take much elevation of pressure within the wellhead before uneven loading, uneven expansion and/or deflection of the casing bonnet neck would permit the escape of pressure between the sealing faces 72 and 74. Accordingly, if the band 72 is made larger in radius, along its whole length, by a constant amount X, the band 72 will extensively contact the band 74 before the bolt assemblies 56 are fully tightened, and further tightening of the bolt assemblies 56 will resiliently load the band 72 against the band 74. At an extreme, if X is made too large, fully tightening the bolt assemblies 56 can result in permanent, catastrophic deformation of the casing bonnet neck. Accordingly, the amount of compressive stress that can safely be placed on the band 72 is subject to calculation using standard engineering calculations, and the magnitude of X that would produce that acceptable amount of stress can be calculated.

For the type of wellhead equipment 10 for which the invention was developed, the usual area of the seat and seal bands at 72, 74 is so great that when X is made as large as it safely can be made using standard engineering calculations, the amount of contact pressure in force per unit area is deemed insufficient to confine high pressures (e.g. 30,000 p.s.i.), in the expected range of internal temperature ($-75°$ F. to $600°$ F.). Accordingly, by preference, much of the band 72 is machined away by a uniform amount Y, leaving two narrower bands B1, B2, where the complementary radius remains augmented by the amount X. Thus, when the equipment is made-up and the bolt assemblies 56 are fully tightened, the seal 65 between the outside surface of the casing bonnet neck 66 and the bore of the tubing head 54 is made only where the bands B1, B2 are forced into interference fit with the surface 74. The bands B1, B2 are made small enough in surface area that the amount of contact pressure in sealing force per unit area provided upon tightening of the bolt assemblies 56 is deemed sufficient to confine the expected maximum high fluid pressure in the expected range of internal temperature. However, the bands B1, B2 are made large enough that, although they may deform somewhat in being forced into interference with the surface 74, and although the surface 74 may be consequently deformed somewhat, and although the outer end region of the tubular neck 66, being circumferentially subjected to such compressive stress may deflect somewhat, none of these reactions results in fully unrecoverable deformation. Although there may be some plastic flow, unrelieved resilient stress remains for recovery upon any later intentional loosening of the bolt assemblies 56.

By preference, the bands 72 on which the bands B1, B2 are formed have base diameters in the range of 1-15 inches, and a taper of about 4 inches per foot ($18°\ 15'\ 30''$), or less, although the principles of the invention may be applied to centrally ribbed double tapered sealing rings (e.g. Grayloc ® rings of Gray Tool Company, Houston, Texas) some of which may have tapering sealing surfaces with a greater included angle.

It should now be apparent that the metal-to-metal seal as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A metal-to-metal seal for use in a high pressure environment typical of a wellhead assembly that is provided on a high pressure, high temperature gas well, comprising:

a tubular part having an outside circumferential surface leading to an end;

a relatively massive part having an internal chamber with an inside circumferential surface;

the tubular part being coaxially at least partially received in said internal chamber so that said inside circumferential surface of the relatively massive part surrounds said outside circumferential surface of the tubular part;

adjustable securement means associated with said tubular part and said relatively massive part for telescoping the tubular part into the internal chamber of the relatively massive part until a predetermined relative axial disposition of these parts is achieved;

said inside circumferential surface having a taper, said outside circumferential surface being relieved so as to have a substantially complementary taper over most of the axial extent thereof, but having at least one narrow band in which a respective prominant circumferential rib is externally formed on said tubular part on and intermediate the axial extent of said outside circumferential surface, said at least one narrow band being so prominent that when said adjustable securement means is adjusted to bring said tubular part and said massive part to said predetermined relative axial disposition is achieved, said at least one rib on said tubular part is in interference fit with said tapered inside circumferential surface on said relatively massive part, with a resilient circumferential engagement essentially characterized by incomplete crushing of said at least one rib.

2. The metal-to-metal seal of claim 1, wherein:
said at least one rib is constituted by two closely-spaced ribs each having a radially outer surface that is tapered complementarily to said tapered inside circumferential surface of said relatively massive part.

3. The metal-to-metal seal of claim 1 or claim 2, in which:
the relatively massive part is a tubing head and the tubular part is the neck of a casing bonnet.

4. The metal-to-metal seal of claim 3, wherein:
at said predetermined axial position, the interference fit of the at least one rib with the inside circumferential surface is sufficient to provide a seal.

5. The metal-to-metal seal of claim 1 or claim 2, in which:
the relatively massive part is a body of a casing bonnet and the tubular part is an upper end marginal portion of a casing.

6. The metal-to-metal seal of claim 5, wherein:
at said predetermined axial position, the interference fit of the at least one rib with the inside circumferential surface is sufficient to provide a seal.

7. A metal-to-metal seal, comprising:
a relatively massive outer part having a bore provided with a mostly radially inwardly facing tapering surface portion in a circumferential band providing a sealing seat;
another part having a tubular wall which near one end is provided with a mostly radially outwardly facing tapering surface portion in a circumferential band, means integrally providing a plurality of closely axially spaced circumferential ridges on the radially outwardly facing tapering surface portion, intermediate the axial extent of this circumferential band, these two ridges having radially outer circumferential surfaces which are arranged for extensive surface engagement with said sealing seat;
means pulling the relatively massive part and said other part axially together to a predetermined substantially fixed extent, whereat the radially outer circumferential surfaces of the two bands are in resilient interference fit with said sealing seat.

* * * * *